(12) United States Patent
Burt

(10) Patent No.: US 8,559,609 B2
(45) Date of Patent: Oct. 15, 2013

(54) TELECONFERENCING SYSTEM FOR ALLOWING ONE TOUCH QUEUING BY CALLERS IN A FACILITATOR LED DISCUSSION

(76) Inventor: Brian D Burt, Oakland, CA (US)

( * ) Notice: Subject to any disclaimer, the term of this patent is extended or adjusted under 35 U.S.C. 154(b) by 40 days.

(21) Appl. No.: 13/064,853

(22) Filed: Apr. 21, 2011

(65) Prior Publication Data

US 2011/0261938 A1 Oct. 27, 2011

Related U.S. Application Data

(60) Provisional application No. 61/343,108, filed on Apr. 22, 2010.

(51) Int. Cl.
*H04M 1/00* (2006.01)
*H04M 3/42* (2006.01)

(52) U.S. Cl.
USPC .................. 379/158; 379/203.01; 379/212.01; 370/260

(58) Field of Classification Search
USPC .................. 379/158, 202.01, 203.01, 204.01, 379/205.01, 212.01; 370/260, 261, 263
See application file for complete search history.

(56) References Cited

U.S. PATENT DOCUMENTS

| | | | |
|---|---|---|---|
| 2005/0129208 A1* | 6/2005 | McGrath et al. | 379/218.01 |
| 2005/0149630 A1* | 7/2005 | Smolinski et al. | 709/227 |
| 2011/0090899 A1* | 4/2011 | Fedorov | 370/352 |

* cited by examiner

*Primary Examiner* — Binh Tieu

(57) ABSTRACT

A teleconferencing system for establishing a facilitator-led teleconference involving a plurality of callers, a facilitator, and at least one party that can receive transfers. The teleconferencing system is operated by the facilitator under the control of application software through a user interface. A facilitator-led teleconference is formed and the callers are informed of how to initiate a transfer to the party, such as by touching of a key on their telephone keypad. The system detects the callers who initiate transfer. If the party is available the initiating caller is automatically transferred to that party. If the party is not available, such as would happen if numerous callers initiate transfer to that party, the initiating callers are placed into a transfer queue. When the party becomes available the callers in the queue are then transferred in queue order. Preferably an initiating caller remains in the facilitator-led teleconference until transfer and all transfers are performed with disruption to the ongoing teleconference.

20 Claims, 3 Drawing Sheets

TELECONFERENCING SYSTEM FOR ALLOWING ONE TOUCH QUEUING BY CALLERS IN A FACILITATOR LED DISCUSSION

CROSS-REFERENCE TO RELATED APPLICATIONS

This application claims the benefits of the following U.S. Provisional Applications: "Teleconferencing system for allowing one touch transfer from a facilitator-led discussion," Provisional Application No. 61/343,113, filed Apr. 22, 2010; "Teleconferencing system for allowing interchange between facilitator-led discussions and reporting information about selected callers," Provisional Application No. 61/343,112, filed Apr. 22, 2010; "Teleconferencing system for allowing one touch queuing by callers in a facilitator-led discussion," Provisional Application No. 61/343,108, filed Apr. 22, 2010; "Teleconferencing system for allowing large numbers of callers by transferring callers to connected servers in a call bridge," Provisional Application No. 61/343,107, filed Apr. 22, 2010; "Teleconferencing system for allowing the breaking out of groups of callers into sub-teleconferences and the reporting of callers speaking in the sub-teleconferences," Provisional Application No. 61/343,106, filed Apr. 22, 2010; "Teleconferencing system for allowing interchange in facilitator-led discussions and sending information to callers electing to receive the information," Provisional Application No. 61/343,105, filed Apr. 22, 2010; "Teleconferencing system for allowing interchange between facilitator-led discussions in a main conference and breaking out groups into sub-conferences," Provisional Application No. 61/343,104, filed Apr. 22, 2010.

FIELD OF THE INVENTION

The presently disclosed subject matter is directed towards a facilitator-led teleconferencing system that enables a caller to join a facilitator-led teleconference and to then either transfer to another party or to place their call in a queue to be transferred to another party upon the party becoming available.

BACKGROUND OF THE INVENTION

A very common way to hold a meeting and to perform group activities with widely dispersed people is teleconferencing. Teleconferencing is highly useful because it allows callers from around the world to participate in the same meeting at low cost.

Teleconferencing has been so successful that user demands have resulted in the development of modern teleconferencing "bridge systems" that allow callers to either dial into or log onto a computerized system that establishes a virtual teleconference. In such systems callers usually have to identify themselves, their access rights are checked, a facilitator is established, and operating rules are set and enforced by the bridge system.

Teleconferencing and the newer bridge systems generally support modern trends in education, business, and other group activities which focus on increasing the number and quality of interactions. For example, modern trends in education lean away from strictly lecture driven modalities and focus more on greater individual participation. In practice, teleconferencing participants are often looked at as resources of an organization, and as such the desire to incorporate those participants in decision-making at all levels has increased. This becomes a major problem as the geographic diversity of organizations and their participant's increases and as the need for better communications, such as teleconferencing, becomes even more critical. In fact, modern trends have placed such additional burdens on teleconferencing systems that even the newer "bridge teleconferencing systems" are often deemed insufficient.

The result of the foregoing is that more and more programs, be they sales, educational, marketing, or simply group meetings are being delivered and conducted via teleconferencing systems. Teleconferencing reduces costs, makes more efficient use of time, and makes a given meeting available to a greater segment of the population, including home or bed-ridden individuals.

While generally successful, teleconferences have numerous, well-known limitations. Those limitations are a result of, or are acerbated by, the fact that the normal visual cues available with in-person meetings are often not available in a teleconference. For example, it is often difficult for a facilitator to determine if one or more participants would like to transfer out of a teleconference to a different party, such as a sales representative, without disrupting the teleconference. Complicating that problem is that the different party in question may be busy handling other callers or tasks.

There are telephone answering systems that allow users to be directed to a particular party based on selected answers to questions asked by the answering system. Such systems, however, lack the ability to enable a caller to join a facilitator-led teleconference and then to transfer their call to a different party during the teleconference. Furthermore, such systems do not have queues for callers that wish to transfer to another party when a party is not available such that the transfer order is maintained.

Therefore, a teleconferencing system that enables a caller to join a facilitator-led teleconference and to subsequently either immediately transfer their calls to another party or to place their call in a transfer queue so as to be transferred to that other party upon that party becoming available would be beneficial. It would be beneficial if the transferring or joining of the transfer queue could be done at the touch of a button and without disturbing the ongoing teleconference. Also beneficially the transferred-to party would have caller information and transfer queue information made available to them on a user interface.

BRIEF SUMMARY OF THE INVENTION

It is an object of the invention to provide a facilitator-led teleconferencing system that allows callers to transfer to a different party, such as a sales representative, by pressing a key on their telephone keypad, a key on a keyboard, or by clicking a mouse.

It is another object of the invention to provide a facilitator-led teleconferencing system that places callers transferring from a facilitator-led teleconference into a queue for transferring their call upon their party becoming available.

It is a further object of the invention to provide a facilitator-led teleconferencing system that maintains a queue of callers seeking transfer from a facilitator-led teleconference to another party wherein the callers in the queue are kept in the facilitator-led teleconference until the party to which they are transferring becomes available.

It is yet a further object of the invention to provide a teleconferencing system which reports contact information about each caller transferring from a facilitator-led discussion to the party to which they are being transferred.

The invention is a teleconferencing system for establishing a facilitator-led teleconference involving a plurality of callers, at least one facilitator, and a least one party that can be transferred to. The teleconferencing system is operated by a facilitator under the control of application software through a user interface. The facilitator may configure the callers in various configurations, including a large teleconference. The callers are informed of their ability to transfer their call to a different party, such as a sales representative, by initiating transfer in a specified manner, such as by touching of a key on their telephone keypad, a key on a keyboard, or by clicking a mouse. The teleconferencing system detects the callers who initiate transfer. If the different party is available the initiating caller is automatically transferred to that different party, beneficially without disruption of the ongoing teleconference. However, if that different party is not available, such as would happen if numerous callers initiate transfer to the same party, the initiating callers are placed into a transfer queue. When the different party becomes available the initiating callers are then transferred to that different party in queue order. Preferably an initiating caller remains in the facilitator-led teleconference until transfer.

A teleconferencing system that is in accord with the principles of the present invention beneficially reports identifying or contact information to the different party of each caller transferring to him or placed in the transfer queue. Also beneficially, transfer and queuing are done in a manner that does not disrupt the ongoing teleconference.

To the accomplishment of the above and related objects, the invention may be embodied in the form illustrated in the accompanying drawings. Attention is called to the fact, however, that the drawings are illustrative only. Variations are contemplated as being in accord with the principles of the present invention, therefore the present invention shall be construed as being limited only by the broad scope of the appended claims.

BRIEF DESCRIPTION OF THE DRAWINGS

The advantages and features of the present invention will become better understood with reference to the following detailed description and claims when taken in conjunction with the accompanying drawings, in which like elements are identified with like symbols, and in which:

DETAILED DESCRIPTION OF THE INVENTION

The presently disclosed subject matter will now be described more fully hereinafter with reference to the accompanying drawings in which one embodiment is shown. However, it should be understood that this invention may take many different forms and thus should not be construed as being limited to the embodiment set forth herein. In the figures, like numbers refer to like elements throughout.

Figure 1:
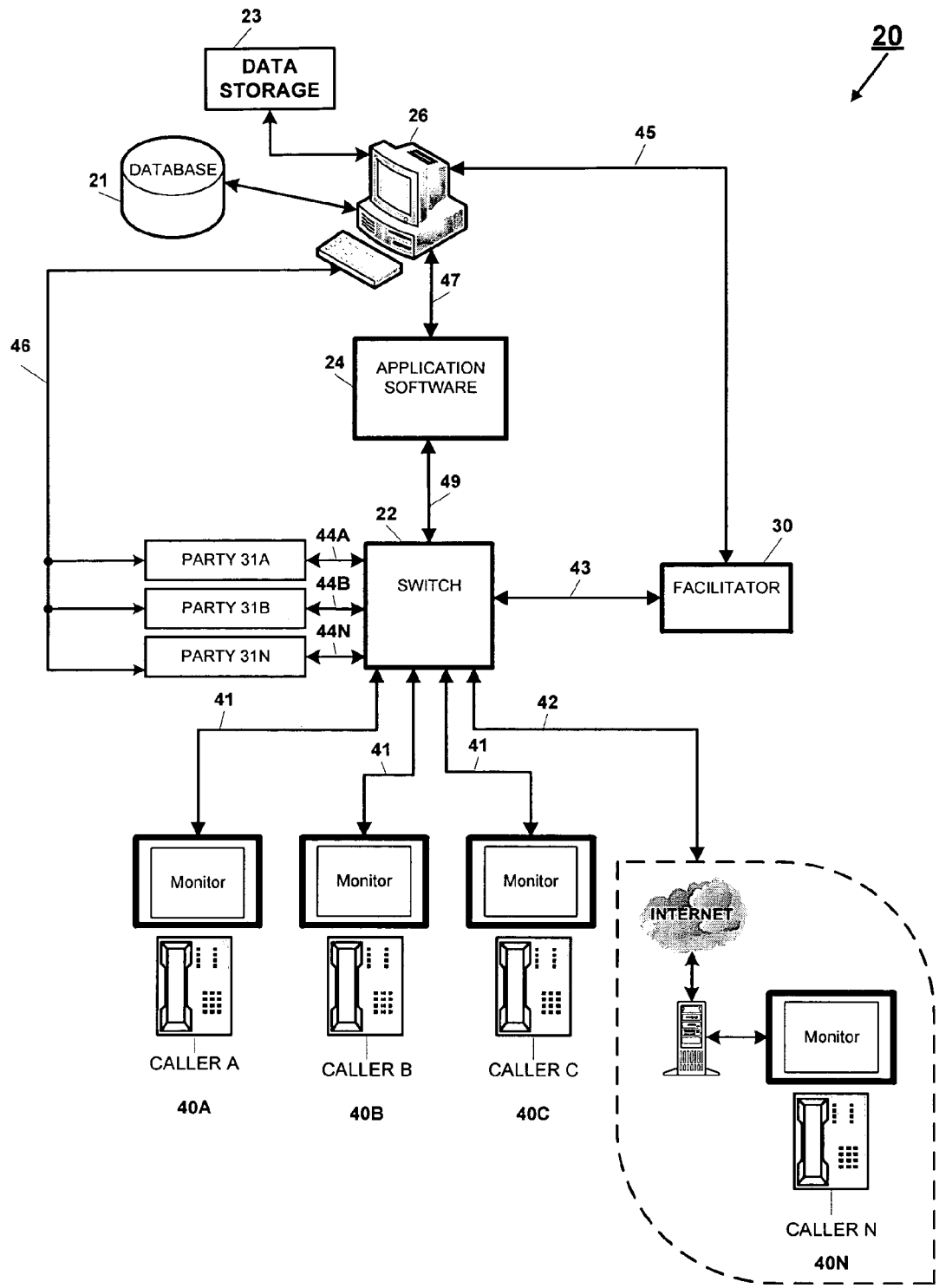
FIG. 1 is a diagrammatic representation of the various stations that comprise an interactive teleconferencing system that is in accord with the principles of the present invention, and in which all callers are in direct communication only with the facilitator.

FIG. 1 illustrates a teleconferencing system 20 having a conferencing switch 22 which is central to the operation of the teleconferencing system 20. The teleconferencing system 20 enables a facilitator 30 to dynamically cause the switch 22 to selectively interconnect a plurality of callers, shown as callers 40A, 40B, 40C, and 40N and the facilitator 30 into a teleconference. The switch 22 further enables a connection to at least one party, or to a plurality of parties, illustrated as party 31A, party 31B, and party 31N. Those parties may or may not become part of an ongoing teleconference.

The callers 40A, 40B, 40C, and 40N, parties 31A-31N, and the facilitator 30 connect to the teleconferencing system 20 using any of an assortment of communication mediums such as telephone lines 41 (as with callers 40A-40C), internet connections 42 (as with caller 40N), and data lines 43 (as with the facilitator 30) and data lines 44A-44N (as with the parties 31A-31N). Of course the teleconferencing system 20 is also contemplated as working with other communication mediums, such as microwave or radio communications. The switch 22 might also accepts data from the callers through audio, video, touch-tone, speech recognition, or other means.

Hardware and firmware suitable for implementing the switch 22 are well known in the art. The switch 22 can be a hardware device or it can be a combination of hardware and software. For example, when used under the control of specific application software (discussed subsequently), an open source software solution such as FreeSwitch, distributed at freeswitch.org, can control hardware that is currently available within existing telecommunication networks to provide the required functionality described herein.

Still referring to FIG. 1, it is contemplated that the switch 22 operates under the control of application software 24, which is comprised of code written to enable both basic teleconferencing functions and to provide the specific functionality to implement the principles of the present invention. The application software 24 might run as part of the switch 22, or it might be applied to the switch 22 by way of a data control port 49 and/or a secondary port 47 from a computer system 26. Preferably the application software 24 runs under the control of the computer system 26. The computer system 26 beneficially provides a graphical user interface (GUI) that enables, via a manual interface 45, control of the computer system 26, the application software 24, and the switch 22 as required to implement the various features of the teleconferencing system 20. Additionally, the computer system 26 beneficially provides graphical user interfaces (GUI) via a data interface 46 for the parties 31A-31N.

Beneficially the computer system 26 implements a web-based GUI which allows the facilitator 30 easy control of the functions of the teleconferencing system 20 using a pointing device such as a mouse. It should be noted that the teleconferencing system 20 generally operates at the behest of a facilitator 30, a person or group that leads the teleconference and controls, by way of the manual interface 45, the computer system 26, the application software 24, and the switch 22. The teleconferencing system 20 may place the facilitator 30 at a different hierarchical level than the individual callers, or it may place the facilitator 30 at the same (common) level as the individual callers. In addition, the telecommunication system 20 may be scaled and configured to have more than one person speaking and interacting with the individual callers as a facilitator 30.

One purpose of the teleconferencing system 20 is to allow interactive teleconferencing between callers, including caller 40A, caller 40B, caller 40C, caller 40N and the facilitator 30. FIG. 1 illustrates the teleconferencing system 20 configured to form a single ongoing teleconference. For ease of description the parties 31A-31N are assumed not to be participating in the ongoing teleconference. However, such is not a requirement and in some configurations those parties may be part of the teleconference.

To assist the facilitator 30 in forming the teleconference, the facilitator 30 is provided with access to a database 21 that can be stored in data storage 23, which will typically be part of the computer system 26. Information in the database can be accessed by the facilitator 30 and by the switch 22 as required. In particular, the teleconferencing system 20 enables the facilitator 30 to have real time information regarding who is in the teleconference. To accomplish this, a) the switch 22, under the direction of the application software 24, monitors the callers 40A, 40B, 40C, and 40N to determine that they are still connected to the teleconferencing system 20 and b) are still connected to the ongoing teleconference. The application software 24 provides the computer system 26 with that information, and the computer system 26 maintains the graphical user interface to keep the facilitator 30 informed in real time about who is currently in this teleconference.

Another purpose of the teleconferencing system 20 is to allow each of the callers 40A-40N to be able to transfer from the teleconference to one of the parties 31A-31N without disturbing the ongoing teleconference. This is performed by a caller initiating a transfer to one of those parties 31A-31N. Beneficially the specific procedure for initiating transfer would have been provided to the callers 40A-40N prior to the time a caller would be interested in initiating a transfer. For example, the callers 40A-40N might be informed prior to joining a teleconference that to transfer to a party, say party 31A, that a caller should press "1" on their telephone keypad. As another example, the callers 40A-40N might be informed when joining a teleconference that to transfer to a party, say party 31B, that a caller should press "2" on their telephone keypad. Alternatively, the callers 40A-40N might be informed during a teleconference that to transfer to a party, say party 31N, that a caller should press "3" on their computer keyboard. While it is not an absolute requirement of the present invention it is beneficial that call transfers are initiated by pressing one button, such as a telephone key or a keyboard key, or by one-click of a mouse coupled to a graphical computer interface.

As a further example, assume that party 31A is a regional sales manager for region A, party 31B is a regional sales manager for region B, while party 31N is a banking representative. As another example, assume that party 31A is telephone support representative, 31B as an internet support representative, and party 31N is computer support representative.

The teleconference system 20 is configured to automatically and immediately transfer callers who initiate a transfer, if such a transfer is currently possible. However, in some cases that might not be possible. For example, assume that callers 40A-40N all decide contemporaneously to transfer to party 31A, but that party 31A can only take one caller at a time. In that case the teleconference system 20, via the application software 24 and the switch 22, place the callers who cannot be immediately transferred into a transfer queue. For example assume the caller 40A is the first caller to initiate a transfer and is immediately transferred to party 31A, caller 40B is the second to initiate a transfer, caller 40C is third, and finally caller 40N is the last to initiate a transfer, but that callers 40B-40N all initiate a transfer while caller 40A is being serviced by party 31A. In that case, caller 40B is placed first in a transfer queue for party 31A, 40C is placed second in that transfer queue, and 40N is placed third in that transfer queue. When caller 40A finishes with party 31A, the teleconference system 20 drops caller 40A (who may be returned to the ongoing teleconference), transfers caller 40B to party 31A, and advances both callers 40C and 40N in the transfer queue.

Yet another purpose of the teleconferencing system 20 is to enable the parties 31A-31N to have real time information regarding who they are currently servicing and who is in their transfer queue. To accomplish this the switch 22 and application software 24 monitor callers 40A, 40B, 40C, and 40N to determine who is has initiated transfer and where they wish to be transferred to. The application software 24 provides the computer system 26 with that information, and the computer system 26 maintains a graphical user interface for each of the parties 31A-31N via data interface 46 to inform those parties in real time about who they are currently speaking with and who is in their transfer queue. Additional information can be retrieved from the database 21 as required to help the parties 31A-31N perform their required duties.

Figure 2:
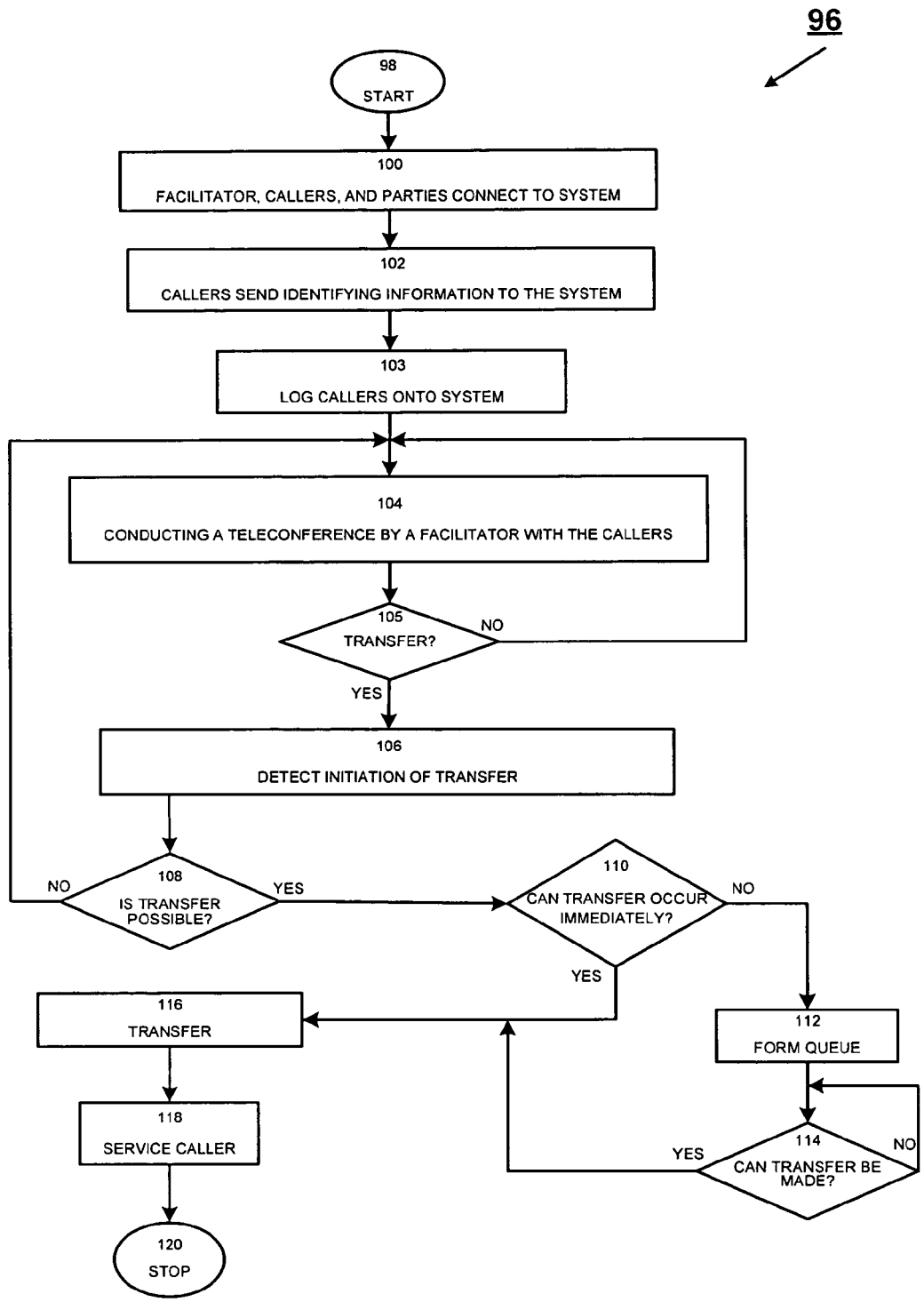
FIG. 2 is a flow chart illustrating the operation of the interactive telecommunication system illustrated in FIG. 1.
Figure 3:
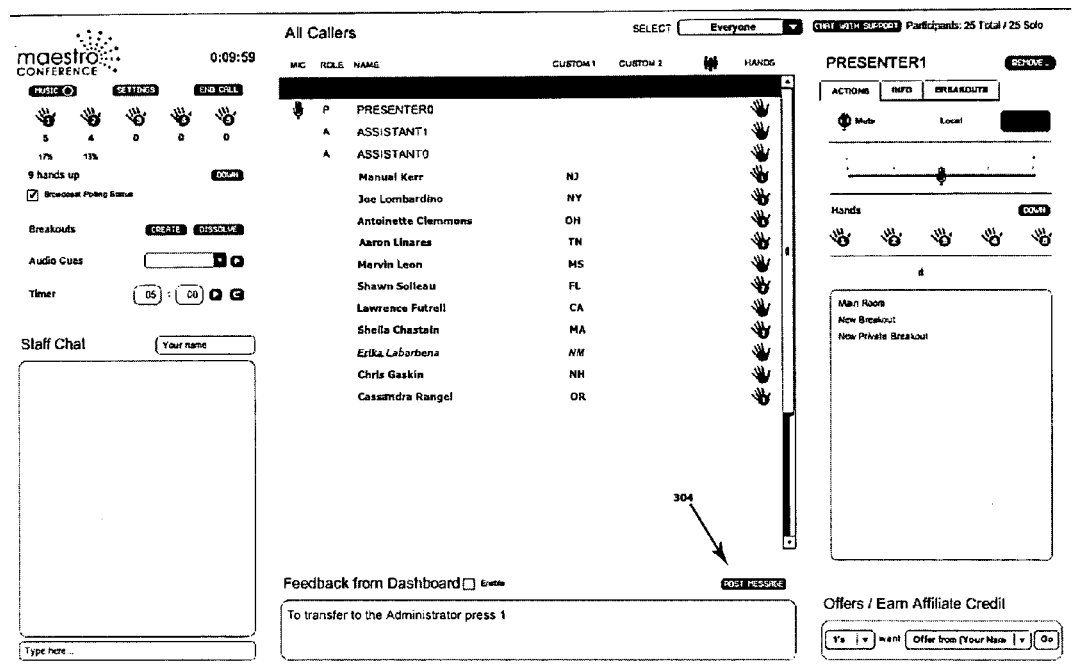

FIG. 2 illustrates the operation 96 of the teleconferencing system 20. The operation 96 starts at step 98 with the facilitator 30, the callers (40A, 40B, 40C, and 40N), and the parties 31A-31N connecting to the teleconferencing system 20, step 100. The callers 40A, 40B, 40C, and 40N send identifying information to the teleconferencing system 20, step 102 and the teleconferencing system 20 logs the callers into the system, step 103. User accounts may have been established prior to step 100 or a user account may be set up at step 102.

A primary purpose of logging in callers is to establish the identity of the callers that are connected to the switch 22. This enables a database record to be accessed for each caller as required by the facilitator 30 and possibly by the parties 31A-31N so that they can make informed decisions when dealing with the callers 40A-40N.

After step 103, the facilitator 30 begins conducting a teleconference with the callers, step 104. During this time the callers 40A-40N decide whether or not to initiate a transfer to a party, step 105. If a transfer is not initiated the callers 40A-40N remain in the on-going teleconference by the teleconferencing system 20 operation 96 returning to step 104. However, if a caller initiates a transfer that initiation is detected by the teleconference system 20, step 106. As noted above, the procedure for initiating a transfer would have been provided to the callers 40A-40N prior to step 105.

After the initiated transfer is detected the teleconference system 20 determines whether a transfer is possible, step 108. Some transfers may not be possible, for example, if a party did not connect to the teleconference system 20 during step 100, if a party has lost connection, or if the teleconference system 20 locks out a caller from making the initiated transfer. As an example, caller 40A might be in region A, and might initiate a transfer to a sales manager party 31B for region B. The application software 24 might be coded such that the teleconference system 20 does not permit that transfer. If the initiated transfer is not possible the operation 96 would return to step 104.

However, if the initiated transfer is possible, the operation 96 proceeds by determining if the transfer can be performed immediately, step 110. If the transfer can be performed immediately the transfer is immediately made, step 116. However, if the transfer cannot be made immediately a queue is formed, step 112. If a queue is formed a determination is then made to determine if transfer of a caller in the queue can be made, step 114. When the transfer can be made the operation 96 proceeds to step 116 and the transfer is made. However, if the transfer cannot be made immediately, a loop is entered at step 114 until a caller can be transferred. Preferably transfer-initiating callers remain in the ongoing teleconference until a transfer is actually made.

Once a transfer is made at step 116 the transferred caller is serviced, step 118. After completion of that service the operation 96 stops for that caller, step 120. It should be noted that servicing of a caller might include transferring that caller back to the ongoing teleconference.

In practice, during steps 110, 112, and 116 the database 21 is updated to enable the teleconferencing system 20 and the parties to have real-time information about what caller is currently being serviced by each party and which callers are currently in transfer queues to be serviced. This would typically be performed by having the computer system 26 update the user interface of each party so that each party knows who is being serviced and who is in their queue. Additional information about each caller can be provided to servicing party as required. Typically, each caller will have provided contact information such as name, phone number, mailing address, zip code, email address and other such information such as the caller's area of interest, title or hierarchy within an organization that may be useful to the servicing party. In some embodiments that information can also be provided to the facilitator 30.

Examples may be useful in explaining the principles of the present invention. Assume that the facilitator 30 has established a teleconference relating to the value of properties in American cities. The facilitator 30 might present a generalized program useful to all of the callers, who will be assumed to be potential real estate investors across America. During the generalized program the facilitator 30 might provide instructions for the callers 40A-40N on how to initiate transfer to regional sales managers. For example, the callers might be informed that to transfer to the regional sales manager party 31A for region A, press "1", for regional sales manager party 31B for region B press "2", and for regional sales manager party 31N for region N press "3". The generalized program might then continue. Then, the callers 40A-40N might initiate transfers with caller 40A transferring to party 31A immediately, caller 40B transferring to party 31B immediately, and party 40C being placed in the queue for party 31B.

In conclusion, herein is presented a teleconferencing system which allows a plurality of callers to attend a facilitator-led teleconference and then to individually transfer to another party without disruption of the ongoing teleconference. The teleconferencing system immediately transfers callers, if possible. If not possible a queue is formed to allow transfer in order. Beneficially the transfers are initiated by pressing a single button such as a key on a telephone pad or a key on a key board, or by making a single click with a mouse. The invention is illustrated by examples in the drawing figures and throughout the written description. It should be understood that numerous variations are possible, while adhering to the inventive concept. Such variations are contemplated as being a part of the present invention.

Therefore, it is to be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

What is claimed:

1. A teleconferencing system, comprising;
   a computer system;
   a switch for interconnecting a plurality of callers, a facilitator and a party using at least one communication medium; and
   application software operatively connected to said computer system, said application software for establishing and controlling said teleconferencing system;
   wherein said application software causes said switch to use said communication medium to interconnect said plurality of callers and said facilitator into a facilitator-led teleconference;
   wherein said application software enables said facilitator to send directions to at least one caller of said plurality of callers on how to initiate a transfer to said party; and
   wherein said application software causes said switch to automatically transfer said at least one caller upon said at least one caller initiating a transfer.

2. A teleconferencing system according to claim 1, wherein said application software can automatically transfer said at least one caller.

3. A teleconferencing system according to claim 1, wherein automatic transfer does not disturb the remainder of said teleconference.

4. A teleconferencing system according to claim 1, wherein said application software detects said transfer initiation and identifies said at least one caller.

5. A teleconferencing system according to claim 1, wherein said facilitator sends directions to said at least one caller using a user interface.

6. A teleconferencing system according to claim 1, wherein said transfer is initiated by said application software detecting said at least one caller pressing a key on a telephone keypad.

7. A teleconferencing system according to claim 1, wherein said transfer is initiated by said application software detecting said at least one caller pressing a key on a keyboard.

8. A teleconferencing system according to claim 1, wherein said transfer is initiated by said application software detecting said at least one caller clicking a mouse.

9. A teleconferencing system, comprising;
   a computer system;
   a switch for interconnecting a plurality of callers, a facilitator and a party using at least one communication medium; and
   application software operatively connected to said computer system, said application software for establishing and controlling said teleconferencing system;
   wherein said application software causes said switch to use said communication medium to interconnect said plurality of callers and said facilitator into a facilitator-led teleconference;
   wherein said application software enables said facilitator to send directions to at least one caller of said plurality of callers on how to initiate a transfer to said party;
   wherein said application software places said at least one caller in a transfer queue upon said at least one caller initiating a transfer if said party is not currently available to accept a transfer; and
   wherein said application software causes said switch to transfer said at least one caller to said party when said party become available.

10. A teleconferencing system according to claim 9, wherein said application software automatically transfers said at least one caller to said party if said party is currently available.

11. A teleconferencing system according to claim 9, wherein said at least one party remains in said teleconference while is said transfer queue.

12. A teleconferencing system according to claim 9, wherein said application software detects said transfer initiation and identifies said at least one caller.

13. A teleconferencing system according to claim 9, wherein said facilitator sends directions to said at least one caller using a user interface.

14. A teleconferencing system according to claim 9, wherein said at least one caller is transferred to said transfer queue upon said application software detecting said at least one caller pressing a key on a telephone keypad.

15. A teleconferencing system according to claim 9, wherein said at least one caller is transferred to said transfer queue upon said application software detecting said at least one caller pressing a key on a keyboard.

16. A teleconferencing system according to claim 9, wherein said at least one caller is transferred to said transfer queue upon said application software detecting said at least one caller clicking a mouse.

17. A method of operating a teleconferencing system comprising the steps of;
- logging a plurality of a callers and a facilitator into a teleconference system;
- conducting a teleconference between the plurality of caller and the facilitator;
- sending directions from the facilitator to the plurality of caller on how to initiate a transfer to a party;
- detecting when at least one caller initiates a transfer to the party; and
- transferring the at least one caller to the party when the party is available.

18. A method of operating a teleconferencing system according to claim 17, further including the step of adding the at least one caller to a transfer queue when the party is not available.

19. A method of operating a teleconferencing system according to claim 18, wherein the at least one caller remains in the teleconference until transfer.

20. A method of operating a teleconferencing system according to claim 17, wherein the facilitator sends directions using a graphic user interface.

* * * * *